United States Patent [19]

Kinneberg et al.

[11] Patent Number: 4,880,904

[45] Date of Patent: Nov. 14, 1989

[54] POLYKETONE-BASED STRUCTURAL ADHESIVE

[75] Inventors: Peter A. Kinneberg, Houston, Tex.; Thomas A. Armer, Westboro, Mass.; Adriaan W. van Breen, Amsterdam, Netherlands; Roger E. C. Barton, Amsterdam, Netherlands; Ebel Klei, Amsterdam, Netherlands

[73] Assignee: Shell Oil Company, Houston, Tex.

[21] Appl. No.: 128,952

[22] Filed: Dec. 4, 1987

[51] Int. Cl.$^4$ ............................................. C08G 67/02
[52] U.S. Cl. .................................. 528/392; 428/411.1
[58] Field of Search .......................................... 528/392

[56] References Cited

U.S. PATENT DOCUMENTS

| | | | |
|---|---|---|---|
| 2,495,285 | 1/1950 | Hoehn | 260/28.5 |
| 3,441,628 | 4/1969 | Ratzsch et al. | 260/683 |
| 3,530,109 | 9/1970 | Fenton | 260/94.9 |
| 3,689,460 | 9/1972 | Nozaki | 260/63 |
| 3,694,412 | 9/1972 | Nozaki | 260/63 |
| 3,808,288 | 4/1974 | Hackhel | 260/828 |
| 3,870,552 | 3/1975 | Hackhel | 117/122 |
| 3,914,391 | 10/1975 | Nozaki | 423/364 |

FOREIGN PATENT DOCUMENTS

| | | |
|---|---|---|
| 0121965 | 10/1984 | European Pat. Off. . |
| 0181014 | 5/1986 | European Pat. Off. . |
| 1081304 | 8/1967 | United Kingdom . |

OTHER PUBLICATIONS

"Novel Palladium (II) Catalzed Copolymerization of Carbon Monoxide with Olefins", Sen. & Li, J. Am. Chem. Soc., 1982, 104, 3520–3522.

Primary Examiner—Harold D. Anderson
Attorney, Agent, or Firm—Dean F. Vance

[57] ABSTRACT

A structural adhesive consisting of:
a linear alternating copolymer or interpolymer consisting of carbon monoxide and at least one ethylenically unsaturated hydrocarbon.

5 Claims, No Drawings

POLYKETONE-BASED STRUCTURAL ADHESIVE

CROSS-REFERENCE TO SIMULTANEOUSLY FILED RELATED APPLICATIONS

"Laminar Structures Prepared With Polyketone-Based Structural Adhesives", Peter A. Kinneberg and Thomas A. Armer, Ser. No. 128,972 filed Dec. 4, 1987 (Attorney Docket No. K-4768 X); "Heat Treated Solvent Cast Polyketone-Based Barrier Films", Leonard E. Gerlowski, Ser. No. 128,967 filed Dec. 4, 1987 (Attorney Docket No. T-4166); and "Melt Processed Polyketone-Based Barrier Films", Leonard E. Gerlowski and John R. Kastelic, Ser. No. 128,968 filed Dec. 4, 1987 (Attorney Docket No. T-4356).

FIELD OF THE INVENTION

The invention relates to a polyketone-based structural adhesive.

BACKGROUND OF THE INVENTION

The general class of polymers of carbon monoxide and one or more ethylenically unsaturated hydrocarbons has been known for some years. Brukaker, U.S. Pat. No. 2,495,285, produced such polymers of relatively low carbon monoxide content in the presence of free radical catalysts such as benzoyl peroxide. British Pat. No. 1,081,304 produced such polymers of higher carbon monoxide content in the presence of alkylphosphone complexes of palladium as catalyst. Nozaki extended the process to arylphosphone complexes of palladium; see, for example, U.S. Pat. No. 3,694,412, also see U.S. Pat. No. 3,914,391.

More recently, the class of linear alternating polymers of carbon monoxide and unsaturated hydrocarbons, now known as polyketones, has become of greater interest, in part because of improved methods of production. Such methods are shown by European Patent Applications 0,181,014 and 0,121,965. The disclosed processes employ, inter alia, a compound of a group VIII metal such as palladium, an anion of a non-hydrohalogenic acid having a pKa below 2 and a bidentate ligand of phosphorus. The resulting polymers are generally high molecular weight thermoplastic polymers having utility in the production of articles such as containers for food and drink and parts for the automotive industry or structural members for use in the construction industry.

There are a variety of methods for preparing polyketones, copolymers of an olefinically unsaturated compound and carbon monoxide. U.S. Pat. Nos. 3,689,460 and 3,694,412 disclose two processes for preparing polyketones. The catalysts described therein are complexes of a palladium, chloride or allyl palladium chloride and two trihydrocarbyl phosphine monodentate-like ligands, such as triphenylphosphine. However, in these disclosed processes the polymer yields are relatively small, less than 35 grams per gram palladium per hour at a pressure of 70 bar. A need has existed to devise a process with a higher yield.

Another process for preparing polyketones is discussed by Sen and Li in an article entitled "Novel Palladium (II)—Catalyzed Copolymerization of Carbon Monoxide With Olefins", J. Am. Chem. Soc. 1982, 104, 3520–3522. This process generates higher yield than the other disclosed processes.

Yet another process for preparing polyketones is disclosed in a currently copending U.S. patent application Ser. No. 908,899, filed Sept. 18, 1986. The process of the copending application is directed towards a preparation of polyketones to obtain a high yield, by polymerizing a mixture of carbon monoxide and alkenically unsaturated hydrocarbon in the presence of a Group VIII metal catalyst containing ligands, wherein hydrocarbon groups are bonded to an element from Group Va, characterized in that, as catalyst, a complex compound is used that is obtained by reacting a palladium, cobalt or nickel compound, a bidente ligand of the general formula:

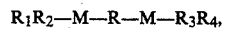

$$R_1R_2-M-R-M-R_3R_4,$$

in which M represents phosphorous, arsenic or antimony, $R_1$, $R_2$, $R_3$, and $R_4$ are identical or different hydrocarbon groups, and R represents a divalent organic bridging group having at least two carbon atoms in the bridge, none of these carbon atoms carrying substituents that may cause stearic hindrance, and an anion of an acid with a pKa of less than two, provided the acid is neither a hydrohalogenic acid nor a carboxylic acid.

Polyketones prepared by the above-described novel high yield process can be used alone as structural adhesives to provide novel, structurally sturdy, solvent resistant adhesives usable, in particular, in car body manufacture.

SUMMARY OF THE INVENTION

This invention relates to structural adhesives prepared from linear alternating polymers of carbon monoxide and at least one ethylenically unsaturated hydrocarbon and to a process for preparing said adhesives.

DESCRIPTION OF THE INVENTION

Adhesives having polyketone polymers are disclosed for example, in U.S. Pat. No. 3,808,288. This '288 patent discloses a tape-backing comprising a polyketone. This particular adhesive is stiff however, it lacks certain desirable qualities for structural adhesives, such as abrasive resistance. This particular adhesive, as well as other types of solvent resistant adhesives are prone to thermal degradation and plasticizer extraction by various oils, hydrocarbons and fuels. Improved structural adhesives have been needed in the car manufacture industry.

It has now been found that stiff structural adhesives having excellent solvent resistance and physical properties such as resistance to thermal degradation and plasticizer extraction can be prepared from certain types of polyketones.

It has been found in accordance with the instant invention that the desired structural adhesive composition can be simply a linear alternating polymer of carbon monoxide and at least one ethylenically unsaturated hydrocarbon.

Preferred polyketone polymers are copolymers of carbon monoxide and ethylene or terpolymers of carbon monoxide, ethylene and a second aliphatic α-olefin of 3 or more carbon atoms, particularly propylene.

Of particular interest are those polymers of molecular weight from about 1,000 to about 200,000, particularly those of molecular weight from about 10,000 to about 50,000, and containing substantially equimolar quantities of carbon monoxide and ethylenically unsaturated hydrocarbon.

Molecular weights for these polymers are determined by conventional NMR testing methods.

Useful polyketones for structural adhesives have limiting viscosity numbers (LVN) as measured by the method wherein the polymer is dissolved in metacresol at 60° C., using a standard capillary viscosity measuring device, such as a Cannon-Ubbelohde viscometer in the range of 0.5 to 10 LVN and more preferably 0.8 to 4 LVN and most preferably 0.8 to 2.5 LVN. Polyketone polymers usable herein have preferred melting points of between about 196°-225° C. though polymers with melting points ranging from about 180° to about 280° C. may be usable herein.

Such polymers are typically produced by contacting the carbon monoxide and the ethylenically unsaturated hydrocarbon(s) under polymerization conditions in the presence of a catalytic amount of a catalyst formed from a compound of the Group VIII metals palladium, cobalt or nickel, the anion of a non-hydrohalogenic acid of a pKa less than about 6, preferably less than about 2, and a bidentate ligand of phosphorus, arsenic or antimony. Although the scope of the polymerization is extensive, for purposes of illustration, a preferred Group VIII metal compound is palladium acetate, the anion is the anion of an acid selected from trifluoroacetic acid and para-toluenesulfonic acid and the bidentate ligand is selected from 1,3-bis(diphenylphosphino)propane and 1,3-bis[di(2-methoxyphenyl)phosphino]propane.

Polymerization of these polymers are typically carried out at polymerization conditions, typically at elevated temperature and pressure, in the gaseous phase or in the liquid phase in the presence of an inert diluent, e.g., a lower alkanol such as methanol or ethanol. The reactants are contacted by conventional methods such as stirring or shaking and subsequent to reaction, the polymer product is recovered as by decantation or filtration. The polymer product may contain metallic residues from the catalyst which are removed by contact with a solvent which is selective for the residues.

The physical properties of the polymer will be determined in part by the molecular weight and by whether the polymer is a copolymer or a terpolymer. Typical melting points are from about 175° C. to about 300° C., more typically from about 210° C. to about 280° C. The structure of the preferred polymers is that of a linear alternating polymer of carbon monoxide, ethylene and any second ethylenically unsaturated hydrocarbon. When terpolymers of carbon monoxide, ethylene and a second ethylenically unsaturated hydrocarbon, e.g., a hydrocarbon of at least 3 carbon atoms, are produced there will be at least two units incorporating moieties of ethylene per unit incorporating a moiety of the second unsaturated hydrocarbon, preferably from about 10 units to about 100 units incorporating moieties of ethylene per unit incorporating a moiety of the second unsaturated hydrocarbon. The polymer chain of the preferred class of polymers is illustrated by the formula

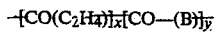

wherein B is the moiety obtained by polymerization of the second ethylenically unsaturated hydrocarbon through the ethylenic unsaturation. The —CO(C₂H₄)— units and the —CO(B)—units occur randomly throughout the polymer molecule and the ratio of y:x is no more than about 0.5. In the modification of the invention which employs copolymers of carbon monoxide and ethylene without the presence of a second ethylenically unsaturated hydrocarbon, the term y=0 and the ratio of y:x is also 0. When terpolymers are employed, i.e., y is greater than 0, ratios of y:x from about 0.01 to about 0.1 are preferred. The end groups or "caps" of the polymer chain will depend on the particular materials present during its production and whether and how the polymer has been purified. The precise nature of the end groups is of little significance with regard to the overall properties of the polymer so that the polymer is fairly represented by the polymer chain as depicted above.

Within the scope of the present invention, its is preferred to use a polyketone polymer having tensile break of about 9400 psi, elongation at break of about 25%, a Youngs modulus of about 321,000 psi, and a 1% SEC modulus of about 225,000 psi.

The present invention also relates to a process for at least partially converting a thermoplastic polymer material into a thermosetting material, characterized in that an article of manufacture that has been produced by processing an alternating copolymer of carbon monoxide and an olefinically unsaturated compound in the molten or thermoplastified condition, is subject to a heat-treatment at a temperature of (T-75) K. to (T-5) K. in which T is the crystalline melting point, in K., of the copolymer, for a period sufficient to increase the gel content of the copolymer to within the range of from 15 to 98%wt without substantially modifying the crystallinity of the copolymer.

Preferably the gel content is increased to at least 30%wt and to at most 85%wt.

Beneficial physical, mechanical and chemical properties that are improved together with the increase in gel content are glass-transition temperature ($T_g$), creep, and solvent resistance. Of interest are also the adhesive properties of the relevant alternating copolymers. The heat-treatment method of this invention, in creating thermosetting character, opens the way towards useful hot-melt adhesives, particularly structural hot-melt adhesives. Excellent bonding strength is achieved in the field of laminates in which one of the substrates is a metal layer and the adhesive layer or layers are made of a copolymer used in this invention. This principle opens the way for making parts or structural elements for the aerospace industries, e.g. helicopter blades may be made from aluminum sheeting that it strengthened by adhering a titanium layer onto it, when using as adhesive a copolymer having an increased gel content that has been obtained in accordance with the process of this invention. This application includes first applying the copolymer as a hot-melt adhesive and then subjecting the copolymer to the heat treatment of this invention. Similarly, car body panels, e.g. doors, can be made by joining an inner structural element to an outer element, using a heat-treated copolymer of this invention as adhesive. The hot melt application of the copolymer for that application does not strictly have to be in the form of a continuous layer. Small amounts of copolymer may be melt-deposited on various positions of the structural elements (spot-adhering), the elements are then pressed together and the assembly is heated, e.g. by passing through an infrared oven to implement the heat-treatment of this invention.

Other suitable applications of the novel products of this invention are in the fields of fiber reinforced composites, film or sheet materials, injection moldings, blow-molded containers, e.g. for organic solvents, reinforcing fibers, extruded piping, profiles and the like.

Heating periods and heating temperatures to be observed in the process of this invention are interdependent in the sense that shorter periods can be employed at higher temperatures. The minimum heat treating temperature is 75 K. below the crystalline melting point of the copolymer. The maximum heat treating temperature is 5 K. below the crystalline melting point. Increase of gel content to values above 98%wt is to be avoided because of the development of too much thermosetting character in the copolymer. The crystallinity of the alternating copolymer remains substantially unmodified. In this sense the heat-treatment of this invention is essentially different from a post-heating of articles of manufacture which is effected at the very melting point of thermoplastics or at even higher temperatures. Such a heat-treatment would not only effect crosslinking in the amorphous phase of the copolymer, but also in the crystalline phase.

Additional components may optionally be added to the adhesive formulation to enhance the properties of the structural adhesive or reduce the cost for preparing the adhesive. Metal scavengers, like gamma alumina can be added to enhance thermal stability. It is also contemplated that additional hardeners, fillers, extenders, fortifiers, carriers, and preservatives of the type known to the art can be added to the novel adhesive.

The polyketone powder should first be dried in a vacuum oven at about 121° C. with a slight nitrogen purge, for about six hours, then placed in a desiccator.

The powder can then be placed in an Internal Brabender Mixer, which has been preheated to about 272° C. The polyketone powder should be added quickly, at about 30 rpm, taking about four minutes. Once the powder is in the mixer, the speed can be increased to about 100 rpm. After about 3 minutes, the sample can be removed from the mixer and placed in a water bath. Optionally, during the 100 rpm mixing phase, additional components, such as 5% gamma alumina, can be added to enhance the thermal stability of the resultant adhesive.

After mixing is complete, the adhesive can be placed in a vacuum oven at 68° C. with a slight nitrogen purge for several hours.

Compression molding of the resulting sample can be carried out at 287° C. to form plaques of the structural adhesive.

The present invention, can be used on a variety of substrates, such as aluminum, mild steel, and cold roll steel. It may be usable as an adhesive for polymer substrates.

The following examples illustrate the unique properties of the inventive adhesive. The tables that follow detail the tensile strength, elongation, modulus according to ASTM test procedures D638 part 35, of this polyketone adhesive accordingly.

EXAMPLE 1

One kilogram of polyketone polymer a linear copolymer of ethylene and carbon monoxide (having 54 mole% ethylene comonomer) which is essentially a blend of a polymer with a molecular weight of 12,000 with a polyketone polymer with a molecular weight of 6500, resulting in a polymer with an average molecular weight of about 10,000 as measured by NMR testing and, a crystalline melting point of 185° C., can be compressed, heated at 278° C. and molded into 0.035 inch plaques. The plaques can be sliced into ½-inch wide strips and placed between two identical metal substrates of cold roll steel. These specimens can then be heated in a compression molder at various compression pressures. Platen temperature was fixed at 278° C. for all molded samples. Typical molding conditions were 30 second preheat at 0 psi followed by a 30 second interval at 30,000 psi.

Cooling times on the strips were 2 minutes.

The resulting laminar structure contained an adhesive layer or "glue layer" about 0.002 inch in thickness. This thickness can be varied depending on the amount of pressure applied to the sample.

A lap shear test was then performed on these laminar structures using ASTM Test Method D638. The results appear on Table 1 which follows.

TABLE 1

ROOM TEMPERATURE LAP SHEAR STRENGTHS - Sample prepared by heating at 287° C. and compression molding polyketone having 54 mole % ethylene content and melting point of 185° C. and average molecular weight of 10,000

| ADHERENT | ALUMINUM-ALUMINUM | MILD STEEL-MILD STEEL | COLD ROLL STEEL-COLD ROLL STEEL | COLD ROLL STEEL-COLD ROLL STEEL |
|---|---|---|---|---|
| Pre-treatment | Toluene/Acetone Wash | No. 1 White Sand Blast ½ mil Deep Texture | Toluene/Acetone Wash | SPRA Bonderite 100 w/Toluene/Acetone wash |
| Glue Layer | 0.025 inch | 0.025 inch | 0.002 inch | 0.005 inch |
| Lap Shear* | 635 psi | 1060 psi | 1312 psi | 2360 psi |
| Failure Mode | Adhesive | Adhesive | Adhesive | Adhesive |

*Pulled @ 0.05 inch/min.

EXAMPLE 2

An alternating copolymer of ethylene and carbon monoxide having an LVN of 1.10 dl.g$^{-1}$, a crystalline melting point of 526 K. and a gel content of 0.1%wt was heated at a temperature of 513 K. during 6, respectively 10 and 15 minutes. Gel content of the heated samples was determined by the method set out hereinbefore. Determination of the crystallinity of the copolymer (Hf value) before and after the heat-treatment showed a relative modification of less than 10%.

TABLE 2

| Heating, min | gel, % wt |
|---|---|
| 0 | <0.1 |
| 6 | 12 |
| 10 | 60 |
| 15 | 90 |

EXAMPLE 3

Strips of the polyketone polymer as described in Example 1 were prepared as in Example 1 but bonded to cold rolled steel which had been previously coated with resin, such as SPRA Bonderite TM 100 available from Oxy Metal industries Corp. of Detroit Michigan. The Bonderite 100 coating was believed to be a zinc phosphate coating. Prior to bonding, the coated cold rolled steel was washed with toluene and acetone.

The sample strips were prepared as in Example 1, however the adhesive layer was 0.005 inch thick. An identical lap shear test was performed on the sample as in Example 1.

EXAMPLE 4

Strips of the polyketone polymer described in Example 1 were prepared as in Example 1. The substrate was changed to be a mild steel which had been pretreated with a No. 1 white sand blast to create a ½ mil deep texture on the substrate surface. In this example, the adhesive layer was 0.025 inch thick. The lap shear test as performed as in Examples 1 and 3 was performed on this laminar structure. The results follow.

Table 1 summarizes the physical properties of the polyketone polymer used in these Examples 1, 3 and 4. The values reported are based on an average of the three enumerated examples.

A polyketone adhesive of the present invention (described in Example 1) has been favorably compared to crosslinkable hot melt epoxies using a room temperature cure to a substrate like cold roll steel, wherein the polyketone based adhesive lap shear approaches the epoxy adhesive lap shear of over 2000 psi when the substrate of cold roll steel has been pretreated with a toluene wash. This comparative data follows in Table 3.

during tensile testing. It is expected that thinner adhesive layers (0.005–0.010 inch) with these two samples would reduce the torque, and should result in significantly higher lap shear strength values.

It is contemplated as within the scope of this invention to prewash the various substrates of the laminar structure can be with at least one of a variety of solvents to enhance bonding. The usable solvents include, but are not limited to, methyl-ether ketone, bis-isopropyl alcohol and xylene.

The above examples are not intended to limit the scope of the invention.

What is claimed is:

1. A structural adhesive consisting essentially of a linear alternating polymer of carbon monoxide and at least one ethylenically unsaturated hydrocarbon, said polymer consisting essentially of recurring units represented by the formula

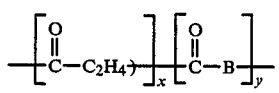

wherein B is the moiety of an ethylenically unsaturated α-olefin of at least 3 carbon atoms polymerized through the ethylenic unsaturation, and the ratio of y:x is no more than about 0.5.

2. The adhesive of claim 1 wherein y is zero.

TABLE 3

| | CROSS-LINKABLE HOT MELT EPOXY - COMPARISON TO POLYKETONE SAMPLES OF TABLE 1 | | |
|---|---|---|---|
| EPOXY | ROOM TEMPERATURE CURE B.U.D. 2000 | TWO PACK BAKED @ 300° F. FOR 30 MIN (A) | ONE PACK BAKED @ 300° F. FOR 30 MIN (A) |
| Adherent | Cold Roll Steel/ Cold Roll Steel/ | Cold Roll Steel/ Cold Roll Steel | Cold Roll Steel/ Cold Roll Steel/ |
| Pre-Treatment | Toluene Wash | Toluene Wash | Toluene Wash |
| Lap Shear | 2500–2800 psi | 2850–3150 psi | 3850–4550 psi |
| Reference | L.R. 16795-101-167 | L.R. 16795-85-83 | L.R. 16559-14 |

(A) Designated as Shell Chemical Company epoxy RSS-716 CX.
All samples were pulled at 0.05 inches per minute Instron.

In Table 3, lap shear values are reported for an exemplary Shell Chemical Company hot melt epoxy system. It can be seen that the lap values of the Bonderite 100 treated steel adherents with the inventive polyketone structural adhesive of Example 1 have approximately the same values as the room temperature cured epoxy samples.

The excessively thick adhesive layers used in the aluminum/aluminum and the mild steel/mild steel samples promoted torque forces to act on the specimens 3. The adhesive of claim 1 wherein the α-olefin is propylene and the ratio of y:x is from about 0.01 to about 0.02.

4. The adhesive of claim 1 wherein the ratio of y:x is from about 0.01 to about 0.2.

5. The adhesive composition of claim 1, further comprising a member of the group comprising: a filler, a hardener, an extender, a fortifier, a carrier, a preservative, or mixtures thereof.

* * * * *